No. 700,623. Patented May 20, 1902.
A. B. CRITZER.
EYEGLASSES.
(Application filed Oct. 21, 1901.)
(No Model.)

WITNESSES:
Jos. A. Ryan
Perry B. Turpin

INVENTOR
Agustus B. Critzer
BY Munn & Co.
ATTORNEYS

UNITED STATES PATENT OFFICE.

AUGUSTUS B. CRITZER, OF SAN ANTONIO, TEXAS.

EYEGLASSES.

SPECIFICATION forming part of Letters Patent No. 700,623, dated May 20, 1902.

Application filed October 21, 1901. Serial No. 79,447. (No model.)

*To all whom it may concern:*

Be it known that I, AUGUSTUS B. CRITZER, a citizen of the United States, and a resident of San Antonio, in the county of Bexar and State of Texas, have made certain new and useful Improvements in Eyeglasses, of which the following is a specification.

My invention is an improvement in eyeglasses, and while it is especially designed for use in connection with the devices covered in my former patent, No. 654,523, dated July 24, 1900, will be found useful apart from improved devices such as shown in my said former patent; and the invention consists in certain novel constructions and combinations of parts, as will be hereinafter described and claimed.

Figure 1:
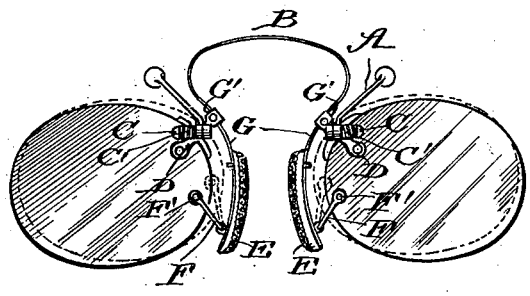
Figure 2:
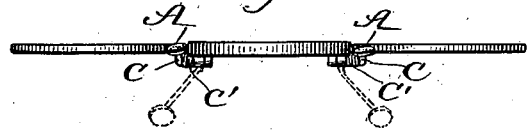
Figure 3:
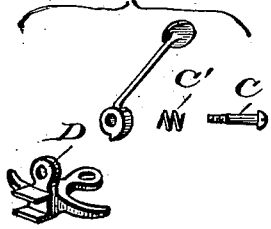
Figures 4, 5:
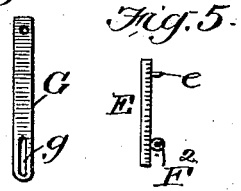
Figure 6:
Figure 7:
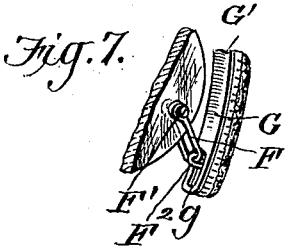

In the drawings, Figure 1 is a front view, and Fig. 2 a top plan view, of a pair of eyeglasses embodying my invention. Fig. 3 is a detail perspective view showing one of the anchors and its supporting devices detached. Fig. 4 is a face view of one of the spring-plates. Fig. 5 is a side view of one of the nosepieces. Fig. 6 is a side view of one of the bails, forming a swinging support for the lower end of one of the nosepieces; and Fig. 7 is a detail perspective view showing parts of one of the lenses and of one of the nosepieces and its actuating-spring.

In my former patent, before referred to, I provide anchor-bars which bear under the frontal bones above the eyes and tend to resist the tendency of the glasses to slip up on the nose. In the construction shown in the accompanying drawings I employ similar anchor-bars A, which may be adjusted into the plane of the eyeglasses, as shown in full lines, Fig. 1, so the glasses can lie flat in a case, as is desired, or such anchor-bars A may be adjusted to the position indicated in dotted lines, Fig. 2, to bear beneath the frontal bone above the eyes. When in the position indicated in dotted lines, Fig. 2, the anchor-bars A of the device illustrated in the accompanying drawings will operate like the corresponding parts of my former patent, before referred to. In the present construction, however, it will be noticed that the anchor-bars A instead of folding against the bow-spring when folded out of position for use are arranged to fold outside the bow-spring B, as best shown in Fig. 1. These anchor-bars A are supported upon a screw C, actuated by a spring C', and are carried by said screw C, in connection with the bracket D, to which the lenses are secured, when the invention is embodied in frameless eyeglasses.

By my present invention I provide nosepieces E, which yield longitudinally in the direction of the spring-bow, as well as apart, so they will operate when put upon the nose to give the glasses an upward tendency toward the anchor-bars, so the touch of the anchor-bars under the frontal bone will be equalized with the touch of the nosepieces on the nose, thereby giving greater comfort to the wearer. By this construction and arrangement should the springs of the nosepieces be a trifle strong they will, instead of producing a harder pressure upon the nose, simply force the glasses upward to a point where the pressure will be equally divided between the upward pressure of the arms and the touch of the nosepieces on the nose. In securing this result I support the nosepieces so they have a movement longitudinally toward and away from the spring-bow and also a movement toward and away from each other, and I do not desire to be limited in this broad feature of my invention to the specific construction shown for securing such result nor to the use of such feature of the glasses in connection with the anchor-bars, as when used alone the nosepieces, operating as described, form a very simple construction for adapting the eyeglasses to the shape of the nose. The nosepieces E may be faced with cork or other suitable padding material and have swinging connection at their lower ends with the opposite glasses. This is preferably effected by means of the stirrups F, which are pivoted at their outer ends F' and loop at their ends F² into connection with eyes projecting outwardly from the nosepieces. As shown and preferred, the nosepieces E are carried by the springs G, suitably secured at their upper ends at G' to the brackets D or other suitable supports and provided near their free ends with slots g, elongated in the direction of their lengths and through which the eyes F² project, as shown in Fig. 7. Near their upper ends the nosepieces E are provided with portions e, which clasp the spring G, so the nosepieces can slide along the said springs, as will be understood from Fig. 1. It will be noticed from Fig. 7 that as the nosepiece G is moved outward toward the lens it will slide downward upon the spring G until its eye F² will engage the lower wall of the slot $g$, so the application of the glasses to position for use will operate to press the glasses upward toward the anchor-bars. In other words, the construction and manner of supporting the nosepieces operate to project the whole eyeglasses upward in use. It will be noticed that the flat spring G as constructed and arranged cannot be drawn outwardly nor forced inward sufficiently to injure it, as it will come to a stop in both directions before it can be damaged. The springs G operate by their efforts to straighten themselves to bring the nosepieces to position for use every time, and the spring-plates and nosepieces are so arranged that they will operate freely and will not become clogged or damaged in any way when in use.

It will be noticed that the nosepieces yield laterally toward the lenses and also have a longitudinal movement independent of said lateral movement.

Having thus described my invention, what I claim as new, and desire to secure by Letters Patent, is—

1. The eyeglasses herein described provided with the spring-bow, with the anchor-bars to bear under the frontal bones, the nosepieces provided with eyes, the swinging stirrups connecting said eyes with the glasses, and the spring-plates suitably supported at one end and free at their other ends and provided near their free ends with slots for the eyes on the nosepieces and the nosepieces being provided with portions clasping the springs all substantially as described whereby the nosepieces will be given a tension toward each other by the spring-plates and will slide along the said spring-plates substantially as set forth.

2. The combination with the opposite glasses and the longitudinally-movable nosepieces, of swinging connections between said nosepieces and their respective glasses and springs for actuating the nosepieces substantially as set forth.

3. In eyeglasses the combination with the opposite glasses, of the nosepieces, the spring-plates for actuating the nosepieces and along which the nosepieces are slidable longitudinally, and swinging carriers for the outer ends of the nosepieces substantially as set forth.

4. In eyeglasses the combination of the spring-plates, the nosepieces held to and slidable along the spring-plates, and swinging connections between the nosepieces and their respective glasses substantially as set forth.

5. Eyeglasses provided with nosepieces which are movable longitudinally or in the direction of their lengths, and with springs independent of the bow-spring for actuating such nosepieces substantially as set forth.

6. An eyeglass provided with anchor devices to bear under the frontal bone and also provided with spring-actuated nosepieces arranged to yield longitudinally and toward and from each other and with devices along which the nosepieces are movable substantially as set forth.

7. The combination of lenses, nosepieces arranged between said lenses and movable longitudinally, springs independent of the bow-spring for actuating the nosepieces and connections between the nosepieces and their respective lenses, substantially as set forth.

8. The combination with the lenses, of the springs extending between said lenses and yielding laterally toward and from the same, and nosepieces movable longitudinally along the said springs and arranged to be actuated thereby, and connections between the glasses and the nosepieces whereby the springs actuate the nosepieces longitudinally and laterally substantially as set forth.

AUGUSTUS B. CRITZER.

Witnesses:
EDWARD OSTROM,
W. E. COX.